United States Patent
Pump et al.

(10) Patent No.: US 9,249,873 B2
(45) Date of Patent: Feb. 2, 2016

(54) POWER TRANSMITTING COMPONENT WITH TORQUE TRANSFER DEVICE CONFIGURED WITH DRAG REDUCTION SYSTEM

(71) Applicant: American Axle & Manufacturing, Inc., Detroit, MI (US)

(72) Inventors: Christopher D. Pump, Macomb, MI (US); Charles G. Stuart, Rochester Hills, MI (US); John C. Hibbler, Lake Orion, MI (US); James P. Downs, South Lyon, MI (US); Shawn S. Proctor, Detroit, MI (US); Robert J. DeGowske, Fair Haven, MI (US); Adrian M. Lenczewski, Detroit, MI (US); Firoz Ali S. Jafri, Detroit, MI (US); Paul J. Valente, Berkley, MI (US); Brian McCormick, Detroit, MI (US); Thomas C. Bowen, Rochester Hills, MI (US); Paul W. Kornosky, Auburn Hills, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 47 days.

(21) Appl. No.: 14/464,029

(22) Filed: Aug. 20, 2014

(65) Prior Publication Data
US 2015/0057125 A1  Feb. 26, 2015

Related U.S. Application Data

(60) Provisional application No. 61/869,415, filed on Aug. 23, 2013.

(51) Int. Cl.
*F16H 48/22* (2006.01)
*F16H 48/06* (2006.01)
*F16H 57/04* (2010.01)
*F16H 48/08* (2006.01)

(52) U.S. Cl.
CPC .............. *F16H 48/22* (2013.01); *F16H 48/06* (2013.01); *F16H 48/08* (2013.01); *F16H 57/042* (2013.01); *F16H 57/0427* (2013.01)

(58) Field of Classification Search
CPC ... F16H 48/22; F16H 57/0427; F16H 57/042; F16H 48/06
See application file for complete search history.

(56) References Cited

U.S. PATENT DOCUMENTS 2,138,169 A  11/1938 Hunt
2,270,482 A   1/1942 Stolte
(Continued)

FOREIGN PATENT DOCUMENTS

KR  20020084591 A  11/2002

*Primary Examiner* — Derek D Knight
(74) *Attorney, Agent, or Firm* — Harness, Dickey & Pierce, P.L.C.

(57) ABSTRACT

The present teachings provide for a power transmitting component including a housing, a clutch, a vent, and a dam. The vent can fluidly couple a first and second cavity. The dam can include a door member. Rotation of the outer carrier through a fluid in the second cavity can sling a portion of the fluid toward the vent to cause the portion of the fluid to be transferred from the second cavity, through the vent, and to the first cavity. When the piston is in a first position, the door member can be in a closed position to limit fluid flow from the first cavity to the second cavity. When the piston is in a second position, the door member can be in an open position to allow fluid to flow from the first cavity to the second cavity.

37 Claims, 11 Drawing Sheets

(56) References Cited

U.S. PATENT DOCUMENTS

| | | | |
|---|---|---|---|
| 2,359,104 A | 9/1944 | Geyer | |
| 2,359,184 A | 9/1944 | Wolfram | |
| 3,128,639 A | 4/1964 | Hein | |
| 3,366,210 A | 1/1968 | Webster | |
| 3,366,211 A | 1/1968 | May | |
| 3,768,613 A | 10/1973 | Brunner | |
| 3,884,335 A | 5/1975 | Ashfield et al. | |
| 4,023,661 A | 5/1977 | Flotow | |
| 4,085,835 A | 4/1978 | Bailey | |
| 4,270,647 A * | 6/1981 | Leber | 192/113.35 |
| 4,282,961 A | 8/1981 | Roscoe | |
| 4,382,497 A | 5/1983 | Sakai et al. | |
| 4,413,716 A | 11/1983 | Newsome et al. | |
| 4,458,793 A | 7/1984 | Riese et al. | |
| 4,488,626 A | 12/1984 | Handke | |
| 4,529,074 A | 7/1985 | Alas | |
| 4,544,055 A | 10/1985 | Kronstadt | |
| 4,751,989 A | 6/1988 | Shinokawa et al. | |
| 4,873,880 A | 10/1989 | Amedei et al. | |
| 4,886,153 A | 12/1989 | Takenaka et al. | |
| 5,131,514 A | 7/1992 | Machida | |
| 5,518,098 A | 5/1996 | Zanetel et al. | |
| 6,189,669 B1 | 2/2001 | Kremer et al. | |
| 6,296,590 B1 | 10/2001 | Gassmann | |
| 6,543,596 B2 | 4/2003 | Martin et al. | |
| 6,550,595 B2 | 4/2003 | Kuczera | |
| 6,595,338 B2 | 7/2003 | Bansbach et al. | |
| 6,837,817 B2 | 1/2005 | Mori et al. | |
| 6,840,363 B2 | 1/2005 | Braford, Jr. et al. | |
| 6,883,657 B2 | 4/2005 | Bansbach et al. | |
| 6,997,299 B2 | 2/2006 | Brissenden et al. | |
| 7,001,298 B2 | 2/2006 | Biermann et al. | |
| 7,111,716 B2 | 9/2006 | Ekonen et al. | |
| 7,294,086 B2 | 11/2007 | Brissenden et al. | |
| 7,416,069 B2 | 8/2008 | Tiesler | |
| 7,540,212 B2 | 6/2009 | Oki et al. | |
| 7,568,568 B2 * | 8/2009 | Porter et al. | 192/35 |
| 7,673,730 B2 | 3/2010 | Metzinger et al. | |
| 7,717,244 B2 | 5/2010 | Rowell | |
| 7,966,901 B2 | 6/2011 | Metzinger et al. | |
| 8,215,440 B2 * | 7/2012 | Hoffmann et al. | 180/247 |
| 8,469,854 B1 * | 6/2013 | Downs et al. | 475/221 |
| 8,795,126 B2 * | 8/2014 | Downs et al. | 475/225 |
| 8,986,148 B2 * | 3/2015 | Downs et al. | 475/204 |
| 2002/0144851 A1 | 10/2002 | Porter | |
| 2004/0106487 A1 | 6/2004 | Mori et al. | |
| 2006/0163018 A1 | 7/2006 | Ekonen et al. | |
| 2008/0128212 A1 | 6/2008 | Utzat et al. | |
| 2008/0214355 A1 | 9/2008 | Capito et al. | |
| 2010/0274456 A1 | 10/2010 | Kondo et al. | |
| 2013/0303326 A1 * | 11/2013 | Downs et al. | 475/221 |
| 2013/0337960 A1 * | 12/2013 | Valente et al. | 475/198 |
| 2015/0141192 A1 * | 5/2015 | Valente | 475/160 |

* cited by examiner

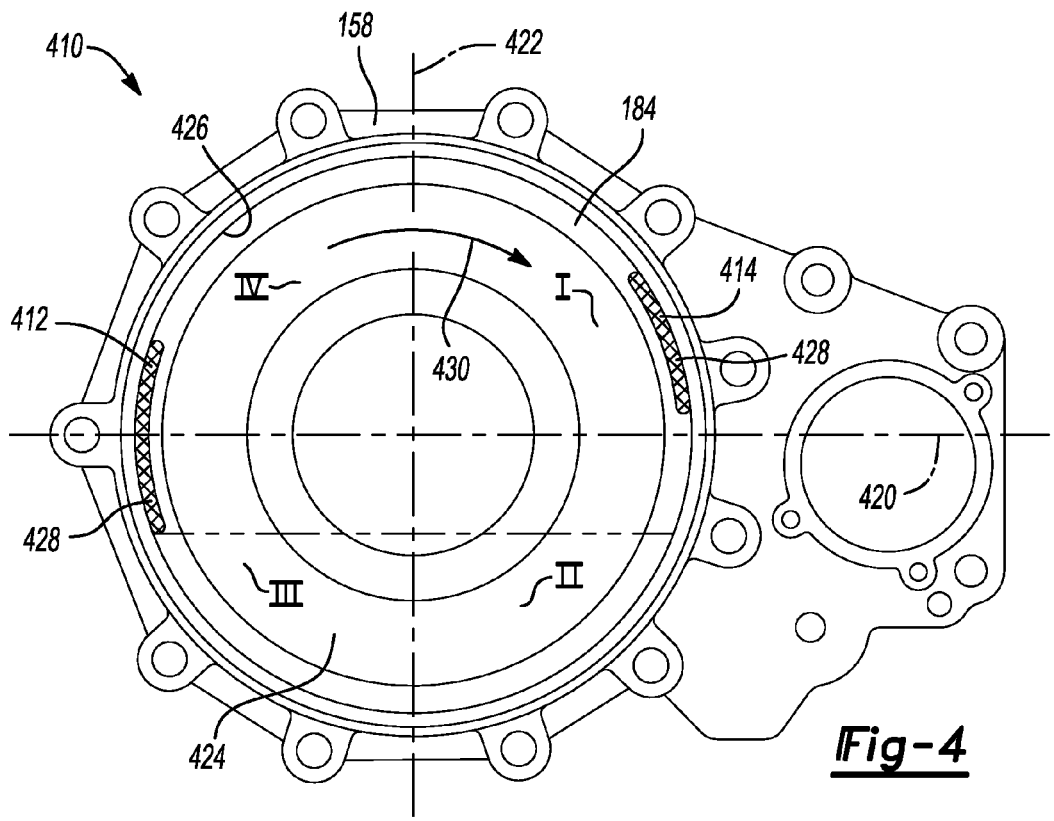
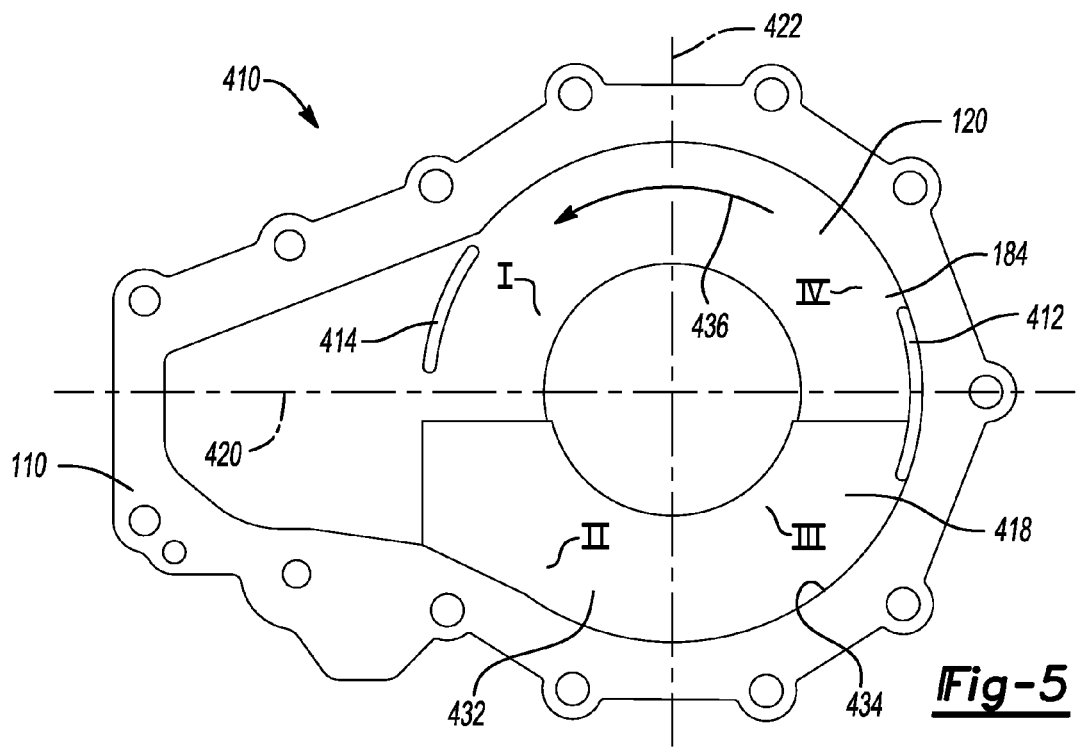

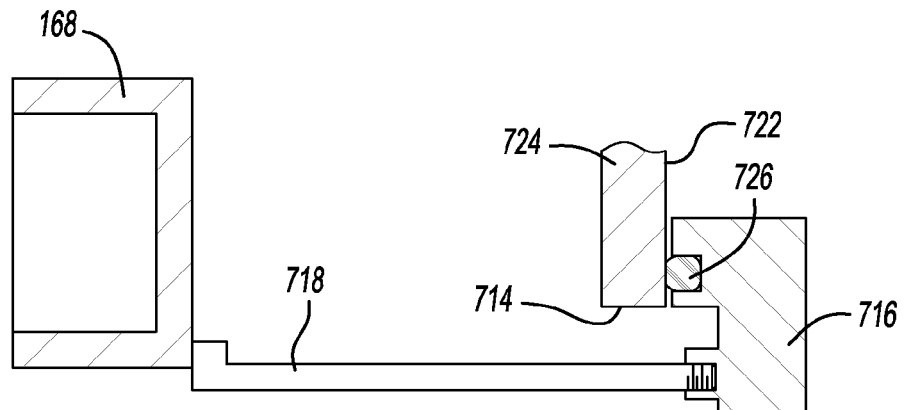
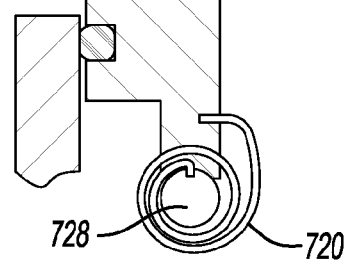
*Fig-8*
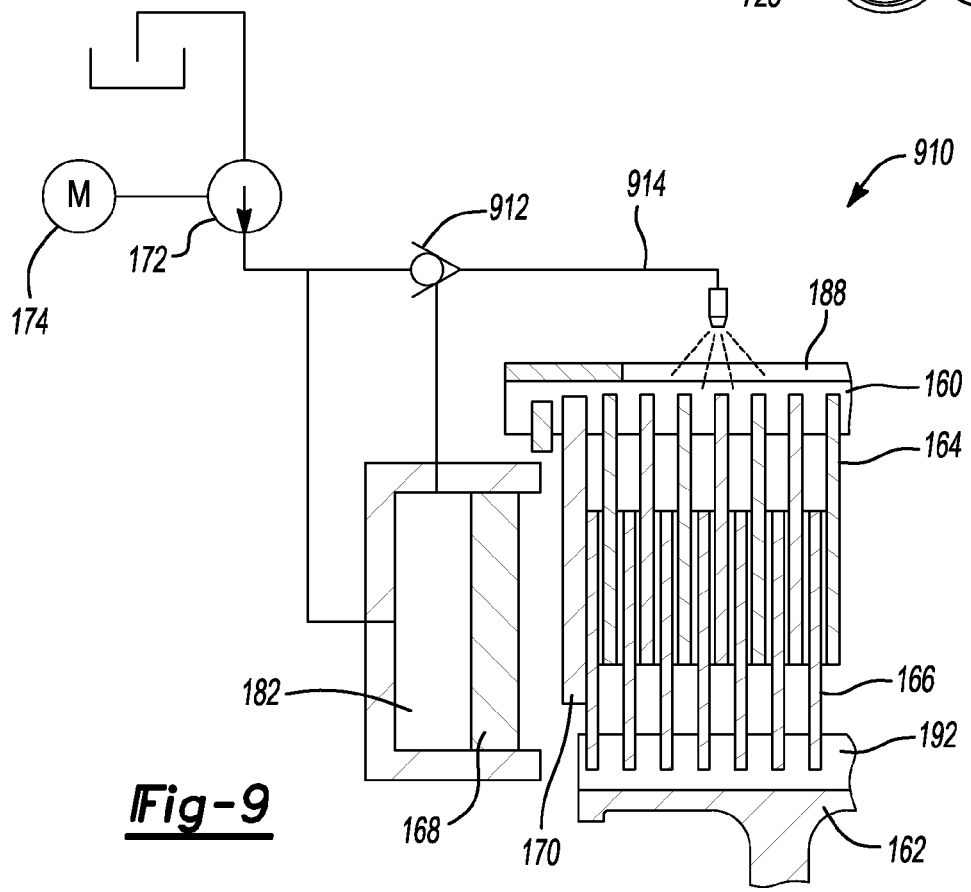
*Fig-9*

POWER TRANSMITTING COMPONENT WITH TORQUE TRANSFER DEVICE CONFIGURED WITH DRAG REDUCTION SYSTEM

CROSS-REFERENCE TO RELATED APPLICATIONS

This application claims the benefit of U.S. Provisional Application No. 61/869,415, filed on Aug. 23, 2013. The entire disclosure of the above application is incorporated herein by reference.

FIELD

The present disclosure relates to a power transmitting component with a torque transfer device that is configured with a drag reduction system.

BACKGROUND

This section provides background information related to the present disclosure which is not necessarily prior art.

Power transmitting components with a torque transfer device, such as a disconnecting drive module in an all wheel drive ("AWD") system, can include a clutch with a plurality of friction plates and a piston for selectively driving the friction plates into engagement with one another. The friction plates are generally bathed in a fluid to provide lubrication and cooling of the friction plates when the clutch is engaged. When the clutch is disengaged, fluid between the friction plates and within a clutch sump through which the friction plates rotate can undesirably increase the system drag torque. To reduce the magnitude of the system drag torque, the level of fluid within the clutch sump could be reduced. However, sufficient fluid must be available during engagement of the clutch to ensure that the clutch will not experience premature wear.

SUMMARY

This section provides a general summary of the disclosure, and is not a comprehensive disclosure of its full scope or all of its features.

The present teachings provide for a power transmitting component including a first output member, a second output member, a housing, an input member, a differential, a clutch assembly, a fluid, a vent, and a dam. The housing can define a first cavity and a second cavity. The input member can be configured to receive rotational power and rotate about a first axis. The differential can include a differential case and a differential gearset. The differential gearset can be configured to transmit rotary power between the differential case and the first and second output members. The clutch assembly can include an inner carrier, an outer carrier, a plurality of first clutch plates, a plurality of second clutch plates, and a piston. The inner carrier can be coupled for rotation with the input member. The outer carrier can be coupled for rotation with the differential case. The first clutch plates can be coupled for rotation with the inner carrier. The second clutch plates can be interleaved with the first clutch plates and coupled for rotation with the outer carrier. The piston can be configured to move between a first position and a second position. The fluid can be received in the first and second cavities. The vent can fluidly couple the first and second cavities. The dam can include a door member that is movable between an open position and a closed position. Rotation of the outer carrier relative to the housing in a predetermined rotational direction through the fluid in the second cavity can sling a portion of the fluid toward the vent to cause the portion of the fluid to be transferred from the second cavity, through the vent, and to the first cavity. When the piston is in the second position, the door member can be in the open position to allow fluid to flow from the first cavity to the second cavity. When the piston is in the first position, the door member can be in the closed position to limit fluid flow from the first cavity to the second cavity.

The present teachings provide for a power transmitting component including a first output member, a second output member, an input pinion, a housing, an input member, a differential, a clutch assembly, a first fluid passageway, and a wiper member. The input pinion can be configured for rotation about a first axis. The housing can define a first cavity and a second cavity. The input member can be received in the first cavity and configured for rotation about a second axis. The input member can have a first face and a second face. The first face can be configured to meshingly engage the input pinion. The differential can include a differential case and a differential gearset. The differential gearset can be configured to transmit rotary power between the differential case and the first and second output members. The clutch assembly can be received in the second cavity and can include a plurality of first clutch plates, and a plurality of second clutch plates. The plurality of first clutch plates can be coupled for rotation with the input member. The plurality of second clutch plates can be interleaved with the first clutch plates and coupled for rotation with the differential case. The first fluid passageway can fluidly couple the first and second cavities. The wiper member can be disposed within the first cavity and configured to direct a fluid from the second face of the input member to the first fluid passageway when the input member rotates relative to the housing about the second axis in a predetermined rotational direction.

The present teachings provide for a power transmitting component including a first output member, a second output member, a housing defining a first cavity and a first reservoir, an input pinion, an input member, a differential, a clutch assembly, a second reservoir, and a pump. The first reservoir can be in fluid communication with the first cavity. The input pinion can be configured for rotation about a first axis. The input member can be received in the first cavity and configured for rotation about a second axis. The input member can be configured to meshingly engage the input pinion. The differential can include a differential case and a differential gearset. The differential gearset can be configured to transmit rotary power between the differential case and the first and second output members. The clutch assembly can include a plurality of first clutch plates, a plurality of second clutch plates, and a piston. The plurality of first clutch plates can be coupled for rotation with the input member. The plurality of second clutch plates can be interleaved with the first clutch plates and coupled for rotation with the differential case. The piston can be configured to translate within a piston chamber in the housing between a first position and a second position. The second reservoir can be fluidly coupled to the first reservoir. The pump can be configured to selectively pump a fluid from the second reservoir to the piston chamber to move the piston from the first position to the second position. The first reservoir can be configured to catch fluid thrown by centrifugal force from the input member when the input member rotates relative to the housing in a predetermined rotational direction. The second reservoir can be separate from the first reservoir and configured to hold a volume of fluid that is employed to move the piston from the first position to the second position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a side elevation view of a portion of the power transmitting component of FIG. 1 illustrating a portion of a housing of a drag reduction system;

FIG. 5 is a side elevation view of an opposite side of the housing that is illustrated in FIG. 4;

FIG. 8 is a detailed view of a portion of the power transmitting component of FIG. 7;

FIG. 9 is a schematic illustration of a third power transmitting component constructed in accordance with the teachings of the present disclosure;

Corresponding reference numerals indicate corresponding parts throughout the several views of the drawings.

DETAILED DESCRIPTION

Example embodiments will now be described more fully with reference to the accompanying drawings.

Figure 1:
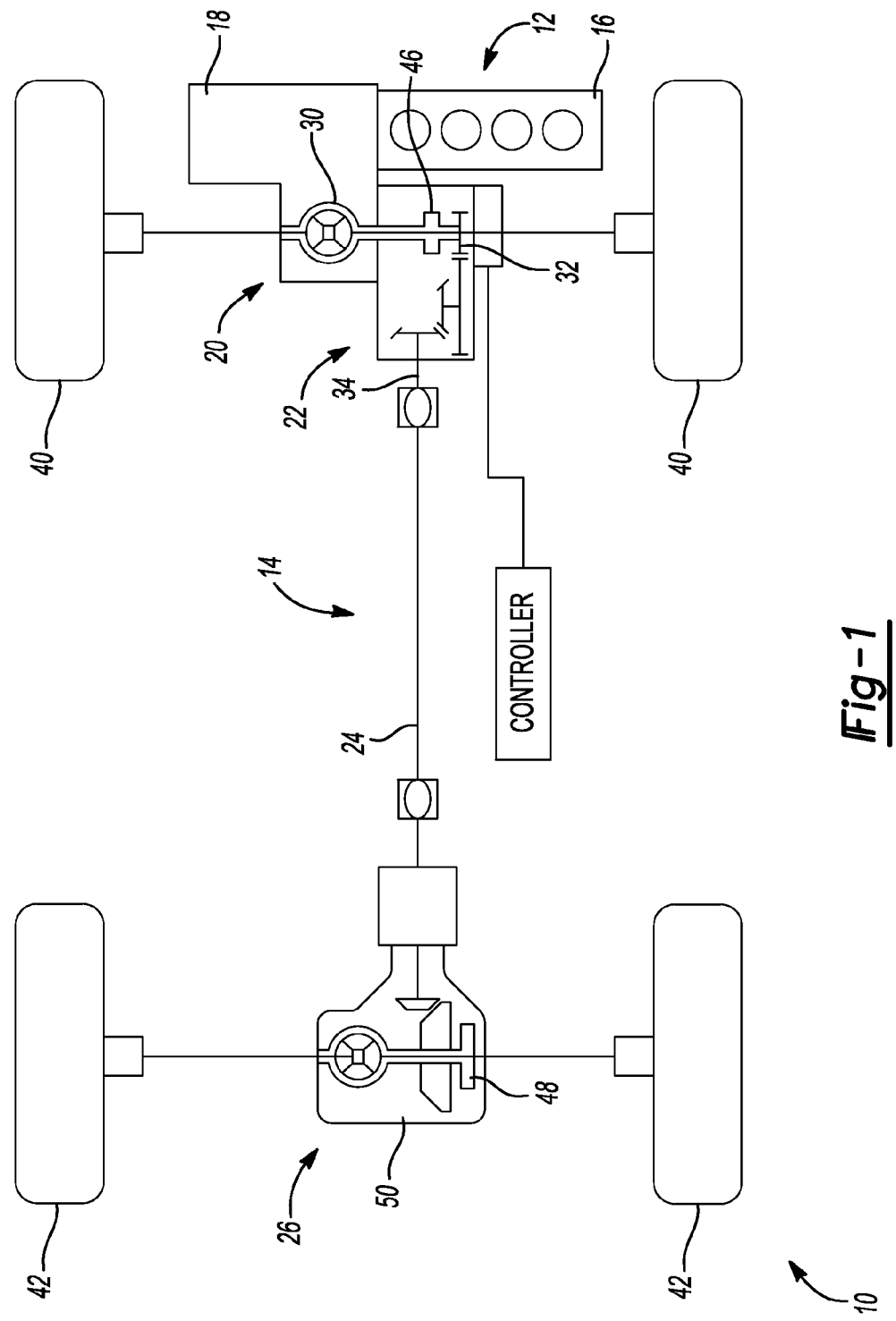
FIG. 1 is a schematic illustration of an exemplary vehicle having a power transmitting component constructed in accordance with the present teachings.

With reference to FIG. 1 of the drawings, an exemplary vehicle having a power transmitting component constructed in accordance with the teachings of the present disclosure is generally indicated by reference numeral 10. The vehicle 10 can have a power train 12 and a drive line or drive train 14. The power train 12 can be conventionally constructed and can comprise a power source 16 and a transmission 18. The power source 16 can be configured to provide propulsive power and can comprise an internal combustion engine and/or an electric motor, for example. The transmission 18 can receive propulsive power from the power source 16 and can output power to the drive train 14. The transmission 18 can have a plurality of automatically or manually-selected gear ratios. The drive train 14 in the particular example provided is of an all-wheel drive configuration, but those of skill in the art will appreciate that the teachings of the present disclosure are applicable to other drive train configurations, including four-wheel drive configurations, rear-wheel drive configurations, and front-wheel drive configurations. The drive train 14 can include a front axle assembly 20, a power take-off unit (PTU) 22, a prop shaft 24 and a rear axle assembly 26. The front axle assembly 20 can be configured in any desired manner, such as a front beam axle or an independent front drive axle. An output of the transmission 18 can be coupled to an input of the front axle assembly 20 to drive an input member 30 of the front axle assembly 20. The PTU 22 can have a PTU input member 32, which can receive rotary power from the input member 30 of the front axle assembly 20, and a PTU output member 34 that can transmit rotary power to the prop shaft 24. The prop shaft 24 can couple the PTU output member 34 to the rear axle assembly 26 such that rotary power output by the PTU 22 is received by the rear axle assembly 26. The rear axle assembly 26 can be configured in any desired manner, such as a rear beam axle, an independent rear drive axle, or a rear drive module. The front axle assembly 20 and the rear axle assembly 26 can be driven on a full-time basis to drive front and rear vehicle wheels 40 and 42, respectively. Alternatively, the drive train 14 can include one or more clutches to interrupt the transmission of rotary power through a part of the drive train 14. In the particular example provided, the drive train 14 includes a first clutch 46, which can be configured to interrupt the transmission of rotary power through the PTU 22 (e.g., decouple the input member 30 of the front axle assembly 20 from the PTU input member 32), and a second clutch 48, which can be configured to control rotation of components within the rear axle assembly 26.

In the particular example provided, the rear axle assembly 26 includes a rear drive module 50 (i.e., a power transmitting component) that is constructed in accordance with the teachings of the present disclosure. It will be appreciated, however, that the teachings of the present disclosure have application to various other power transmitting components, such as transmissions, power take-offs, torque transfer devices, transfer cases, front axle assemblies, center bearing assemblies for propshafts and any other power transmitting components that have a housing, a shaft and a shaft seal.

Figure 2:
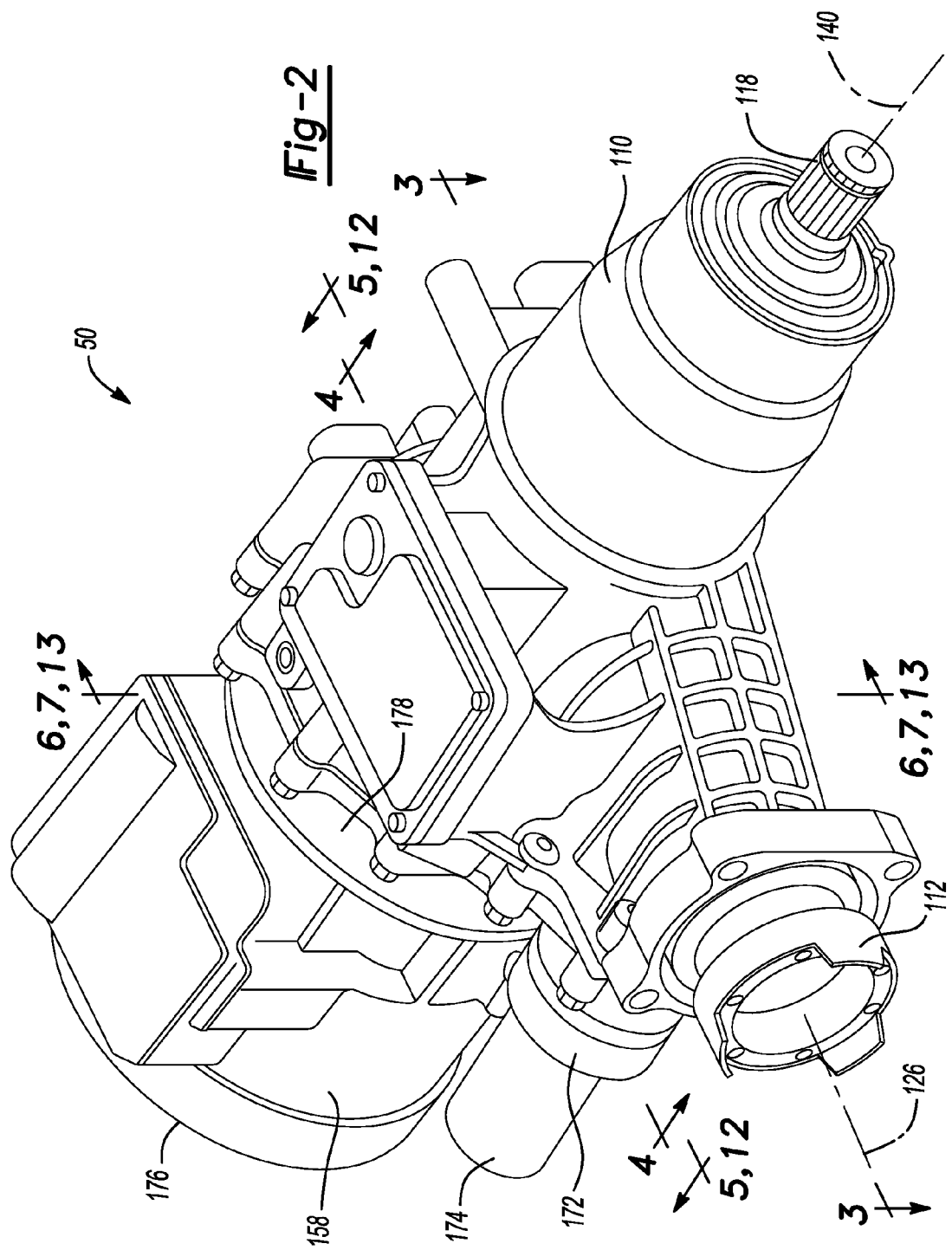
FIG. 2 is a perspective view of the power transmitting component of FIG. 1.
Figure 3:
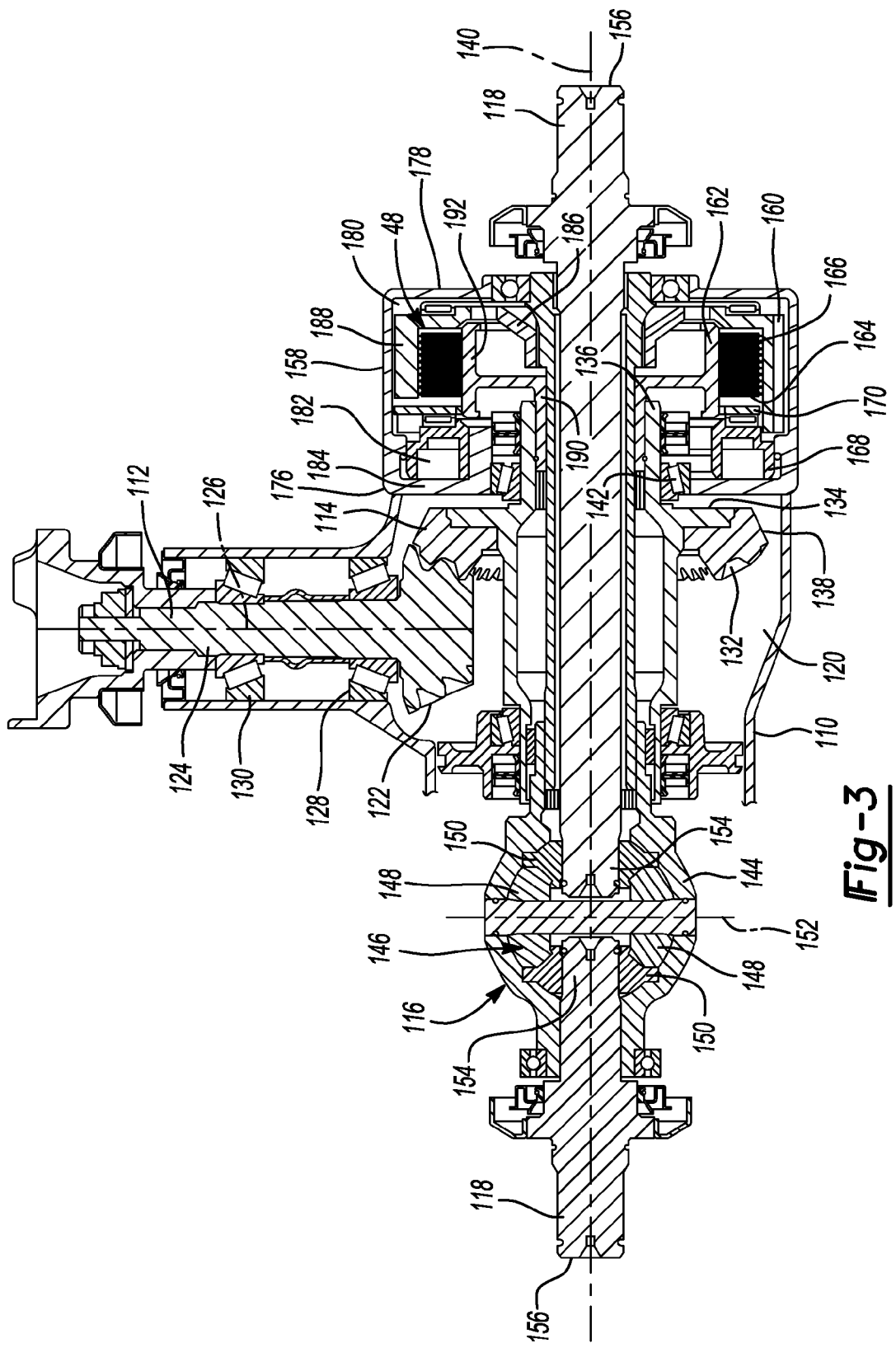
FIG. 3 is a cross-sectional view of the power transmitting unit of FIG. 2 taken along line 3-3 of FIG. 2.

With reference to FIGS. 2 and 3, the rear drive module 50 is illustrated in more detail. The rear drive module 50 can include a housing 110, an input pinion 112, an input member 114, the second clutch 48, a differential assembly 116, and a pair of output shafts 118. The input pinion 112, input member 114, the second clutch 48, the differential assembly 116, and the output shafts 118 can be constructed in a manner that is disclosed in co-pending U.S. patent application Ser. No. 13/470,941 and as such, a detailed discussion of these components is not needed herein. Briefly, the housing 110 can define a first cavity 120 (partially shown in FIGS. 5 and 6) and the input pinion 112 can be a hypoid pinion having a hypoid gear 122 and an input pinion shaft 124. The hypoid gear 122 can be disposed within the first cavity 120. The input pinion shaft 124 can be supported for rotation in the housing 110 along a first axis 126 by a head bearing 128 proximate to the hypoid gear 122 and a tail bearing 130 distal to the hypoid gear 122 and proximate to the prop shaft 24. The input member 114 can be a ring gear having a gear face 132, a back side 134, an axially extending portion 136, and an outer periphery 138. The axially extending portion 136 can be supported for rotation in the housing 110 about a second axis 140 by a bearing 142. The second axis 140 can be generally perpendicular to the first axis 126. The gear face 132 can be meshingly engaged with the hypoid gear 122 of the input pinion 112.

The differential assembly 116 can include a differential case 144 and a differential gearset 146. The differential case 144 can be configured for rotation about the second axis 140. The differential gearset 146 can be configured to transmit rotary power between the differential case 144 and the output shafts 118. In the example provided, the differential gearset 146 includes a pair of side gears 148 and a pair of output gears 150 disposed within the differential case 144. The side gears 148 can be coupled for rotation with the differential case 144 about the second axis 140 and coupled for rotation relative to the differential case 144 about a third axis 152. The third axis 152 can be generally perpendicular to the second axis 140. The output gears 150 can be meshingly engaged with the side gears 148 and configured to rotate about the second axis 140. Each of the output shafts 118 can have a first end 154, which can be drivingly coupled to a respective one of the output gears 150, and a second, opposite end 156 that can be coupled to a corresponding one of the rear wheels 42 (FIG. 1).

The second clutch 48 can be selectively operated to transmit rotary power from the input member 114 to the differential case 144. In the particular example provided, the second clutch 48 is a friction clutch that is mounted co-axially with the input member 114 and the differential assembly 116. The second clutch 48 can include a clutch housing 158, an outer clutch plate carrier 160, an inner clutch plate carrier 162, a plurality of first clutch plates 164, a plurality of second clutch plates 166, a piston 168, an apply plate 170, a pump 172 and a pump motor 174. The clutch housing 158 can be integrally formed with or partially formed by the housing 110 of the rear drive module 50 or can be mounted to the housing 110. The clutch housing 158 can include a first side 176 and a second side 178 that can define a second cavity 180 (shown in FIG. 6) and a piston chamber 182 (shown in FIG. 6). The first side 176 can include a wall 184 that can separate the first cavity 120 from the second cavity 180. The outer and inner clutch plate carriers 160, 162 and the first and second clutch plates 164, 166 can be received in the second cavity 180. The outer clutch plate carrier 160 can have an inner portion 186 and an outer portion 188. The inner portion can be non-rotatably coupled to the differential case 144 and the plurality of first clutch plates 164 can be non-rotatably coupled to the outer portion 188. The inner clutch plate carrier 162 can have an inner portion 190 and an outer portion 192. The inner portion 190 can be non-rotatably coupled to the input member 114 and the plurality of second clutch plates 166 can be non-rotatably coupled to the outer portion 192 and interleaved with the first clutch plates 164 radially between the outer portions 188, 192 of the outer and inner clutch plate carriers 160, 162.

The piston 168 can be received in the piston chamber 182 and configured to translate along the second axis 140. The piston 168 can be configured to move within the piston chamber 182 between an extended position and a retracted position relative to the plurality of first and second clutch plates 164, 166. The pump 172 can be mounted to the housing 110 proximate to the pinion shaft 124 in a space generally between the housing 110 and the clutch housing 158. The pump motor 174 can be a 2-way servo motor capable of running in forward and reverse and can be drivingly coupled to the pump 172 to selectively operate the pump 172. The pump 172 and pump motor 174 can extend radially outward from the first axis, generally parallel to the ground (not shown) and second axis 140, and above the bottom of the housing 110 and clutch housing 158 and can be configured to supply a hydraulic fluid to the piston chamber 182 to move the piston 168 from the retracted position to the extended position. The pump can be configured to selectively remove hydraulic fluid from the piston chamber 182 to move the piston 168 from the extended position to the retracted position The apply plate 170 can be received in the second cavity 180 between the piston 168 and the plurality of first and second clutch plates 164, 166. The piston 168 can be configured to translate the apply plate 170 along the second axis 140 to selectively engage the first and second clutch plates 164, 166 to compress the first and second clutch plates 164, 166 against one another so that the second clutch 48 can transmit rotary power between the input member 114 and the differential case 144. It will be appreciated that the second clutch 48 is not configured to transmit rotary power between the input member 114 and the differential case 144 when the piston 168 is retracted.

Figure 6:
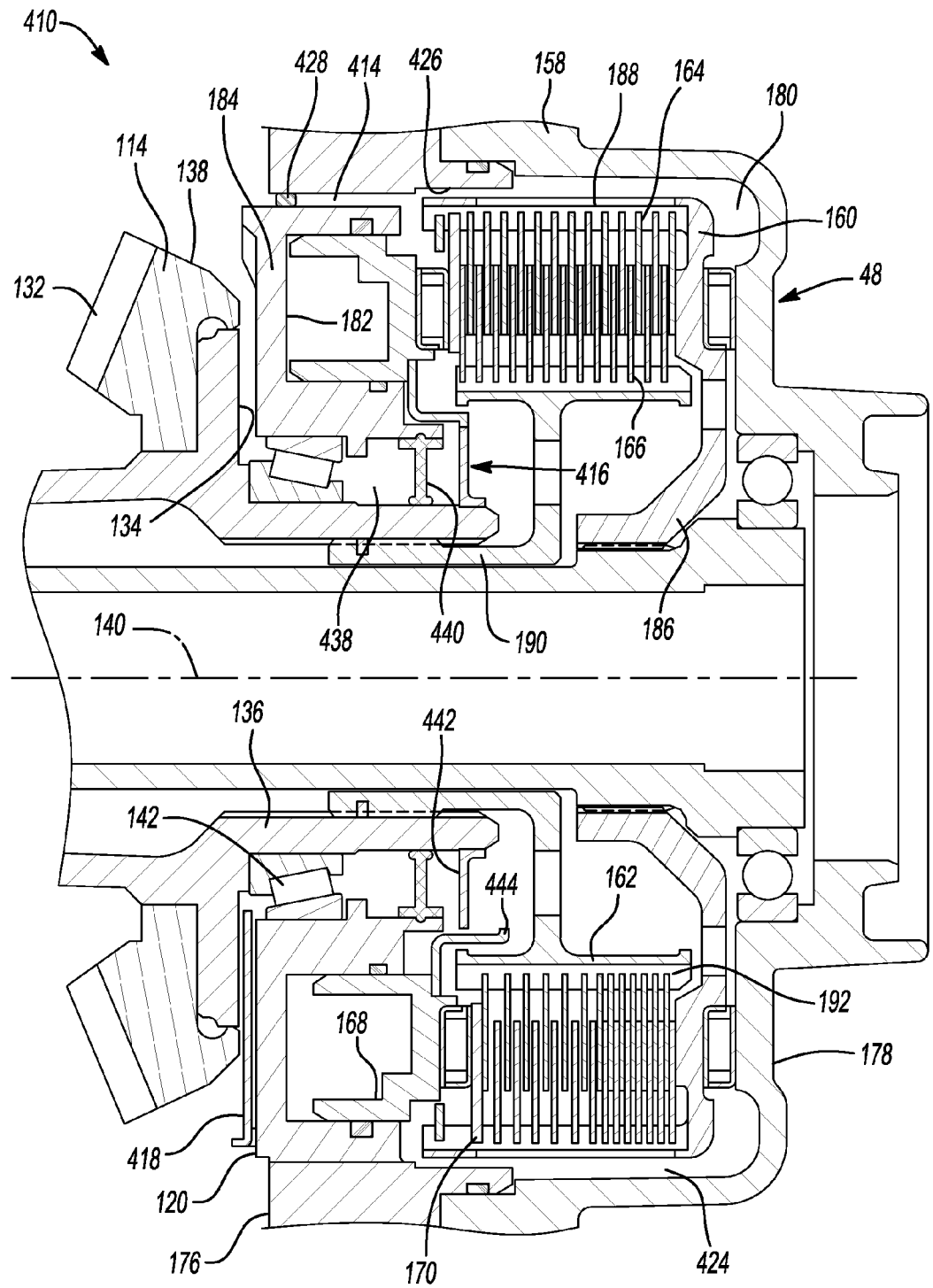
FIG. 6 is a cross-sectional view of the power transmitting component taken along line 6-6 of FIG. 2.

With additional reference to FIGS. 4-6, a drag reduction system 410 of a first construction is shown. The drag reduction system 410 can include one or more vents 412, 414, and an oil dam 416. The drag reduction system 410 can also include a baffle 418 The first and second cavities 120, 180 can be divided into quadrants I, II, III, IV by horizontal center line 420 and vertical center line 422, with quadrants II and III generally proximate to the ground (not shown) during normal operation of the vehicle 10, and quadrants I and II proximate to the input pinion 112. A portion of the second cavity 180 can define a clutch sump 424 wherein a lubricant fluid can collect when the outer clutch plate carrier 160 is not rotating. The wall 184 of the clutch housing 158 can define the vents 412, 414 which can be formed along an outer periphery of the wall 184 proximate to an inner surface 426 of the clutch housing 158. The vents 412, 414 can penetrate through the wall 184 to fluidly couple the first and second cavities 120, 180. In the example provided, vent 412 extends across the horizontal center line 420 to span part of quadrant III and part of quadrent IV, though other locations can be used. Vent 414 is disposed above the horizontal center line 420 within quadrant I, though other locations can be used. The vents 412, 414 can also include a screen 428 configured to limit debris from passing between the first and second cavities 120, 180. During operation of the vehicle in both the two-wheel drive and four-wheel drive modes, the outer clutch plate carrier 160 can rotate in direction 430 within the clutch housing 158 and through the lubricant fluid in the clutch sump 424. Lubricant fluid in the clutch sump 424 can cling to the outer clutch plate carrier 160 as it rotates through the lubricant fluid in the clutch sump 424 and centrifugal force can throw some of the clinging lubricant fluid off the outer clutch plate carrier 160 onto the inner surface 426 of the clutch housing 158. The fluid can flow from the inner surface 426, through the vents 412, 414 to permit the lubricant fluid to drain from the second cavity 180 into another cavity, such as the first cavity 120.

With reference to FIGS. 5 and 6, a portion of the first cavity 120 can define a hypoid sump 432 wherein the lubricant fluid can collect when the input member 114 is not rotating. A baffle 418 can be disposed within the first cavity 120 and within quadrants II and III, between the input member 114 and the wall 184 so that lubricant fluid in the first cavity 120 can return to the clutch sump 424 in a controlled manner. The baffle 418 can be generally planar and extend radially inward from an inner peripheral surface 434 of the housing 110. It will be appreciated that the structure of the clutch housing 158 that defines the fluid vents 412, 414 can extend axially beyond the baffle 418 so that lubricant fluid that drains from the fluid vents 412, 414 will drain into the first cavity 120 on a side of the baffle 418 opposite the wall 184 and not between the baffle 418 and the wall 184. When the input member 114 rotates in direction 436, some of the lubricant fluid can become trapped between the baffle 418 and the wall 184. Since vent 412 extends axially beyond the baffle 418, the baffle 418 can direct the trapped lubricant fluid to the bearing 142 that supports the input member 114 for rotation. The bearing 142 can be a tapered roller bearing, for example, that can act as a pump to move the lubricant fluid axially through an annular cavity 438 that extends radially inward of the wall 184 and between the bearing 142 and the second cavity 180. An annular screen 440 can be disposed in the annular cavity 438 and be configured to limit debris from passing between the first and second cavities 120, 180.

The oil dam 416 can be employed to control the flow of lubricant back into the second cavity 180 through the annular cavity 438. The oil dam 416 can comprise a wall member 442 and a door member 444. The wall member 442 can be coupled for rotation with an axially stationary component, such as the input member 114. The door member 444 can be coupled to the piston 168 or the apply plate 170. When the piston 168 is retracted (as shown in the upper portion of FIG. 6), the door member 444 is aligned to the wall member 442 to inhibit or significantly limit the ingress of lubricant fluid from the annular cavity 438 into the second cavity 180. When the piston 168 is extended (as shown in the lower portion of FIG. 6), the door member 444 is offset from the wall member 442 to permit the ingress of lubricant fluid from the annular cavity into the second cavity 180.

In view of the above discussion, it will be appreciated that the drag reduction system 410 is configured to remove lubricant fluid from the clutch sump 424 of the clutch housing 158 (at least in an area where the outer clutch plate carrier 160 is located) to reduce drag caused by the rotation of the outer clutch plate carrier 160 through the lubricant fluid in the clutch sump 424. The drag reduction system 410 is also configured to permit the re-introduction of lubricant fluid into the clutch sump 424 in an area where the outer and inner clutch plate carriers 160, 162 are located when the second clutch 48 is being actuated (i.e., prior to the full locking of the second clutch 48).

Figure 7:
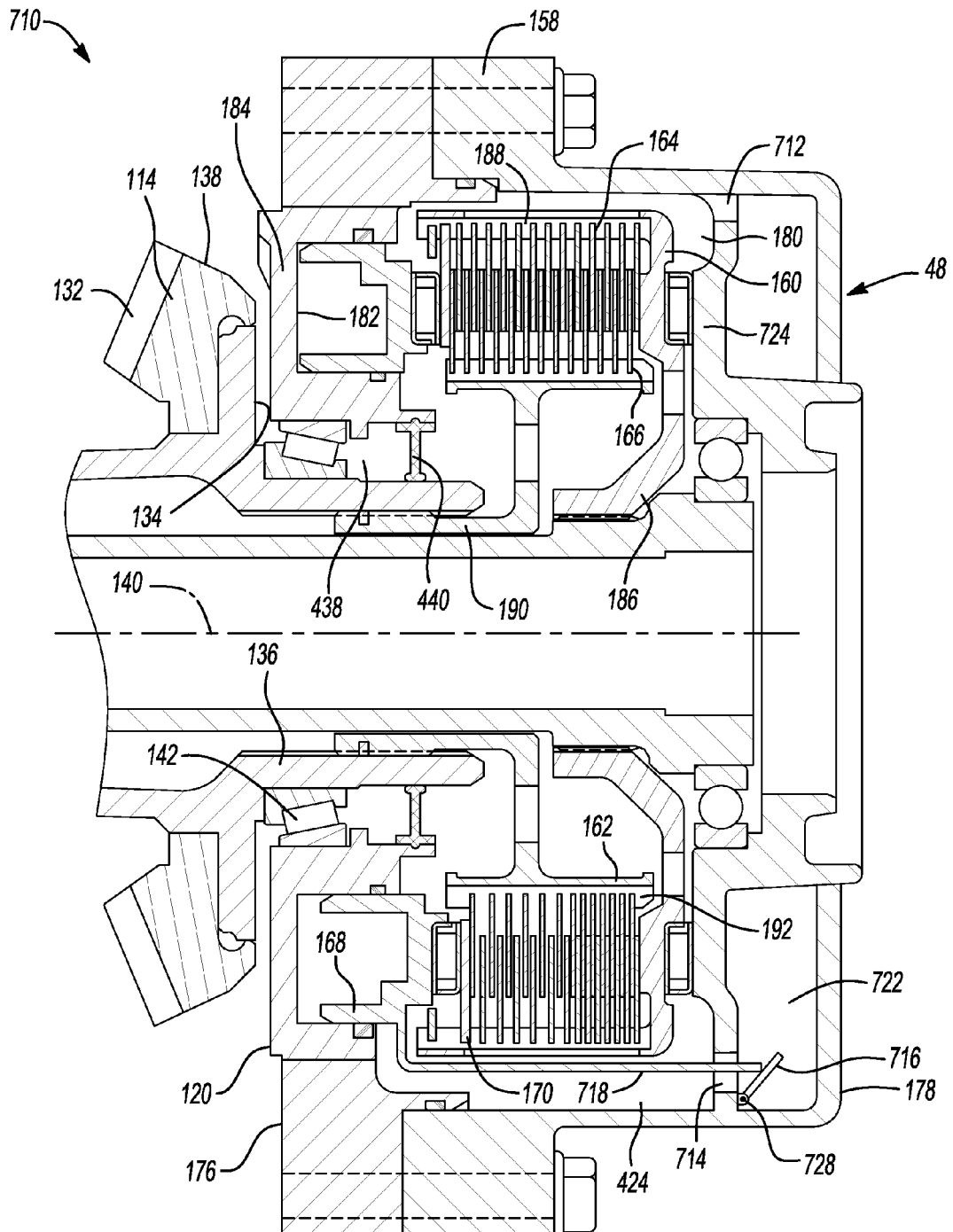
FIG. 7 is a cross-sectional view similar to that of FIG. 6 but depicting a portion of a second power transmitting component constructed in accordance with the teachings of the present disclosure.

With reference to FIGS. 7 and 8, a second drag reduction system 710 constructed in accordance with the teachings of the present disclosure is illustrated. The drag reduction system 710 can include one or more vents 712, a drain aperture 714, a drain plug 716, and a push rod 718. The drag reduction system 710 can also include a biasing means 720. As in the previous example, lubricant fluid can be permitted to be moved from the second cavity 180 to another cavity, specifically a third cavity 722. The third cavity 722 can be defined by the clutch housing 158 and spaced apart from the second cavity 180 by a wall 724. The third cavity 722 can be generally on a side of the second clutch 48 opposite the first cavity 120, such as the second side 178. The vents 712 can be formed in the wall 724 instead of, or in addition to, the vents 412, 414 formed in the wall 184 between the first and second cavities 120, 180 (FIGS. 4 and 5). The vents 712 can be similar to vents 412, 414, such that fluid clings to the outer clutch plate carrier 160 can be thrown by centrifugal force onto the inner surface 426 of the clutch housing 158, where it can flow through the vents 712 to the third cavity 722.

The drain aperture 714 can be defined by the wall 724 and disposed proximate to the lower portion of the third cavity 722 to permit lubricant fluid to drain from the third cavity 722 into the second cavity 180 and can drain into the clutch sump 424 in an area where the outer clutch plate carrier 160 is located. The drain plug 716 can be configured to sealingly engage the wall 724 to close the drain aperture 714 and prevent the fluid from draining through the drain aperture 714. The drain plug 716 can include a seal 726, such as an o-ring for example, configured to sealingly engage the wall 724. The push rod 718 can couple the drain plug 716 to the piston 168 for movement therewith. The biasing means 720 can be employed to urge the piston 168, the push rod 718, and/or the drain plug 716 in a desired direction, such as in a direction that closes the drain plug 716 against the wall 724. In the particular example provided, the drain plug 716 is pivotably coupled to the clutch housing 158 at a pivot 728 and the biasing means 720 comprises a spring that urges the drain plug 716 toward the wall 724. In the example provided, the spring is a clock spring mounted at the pivot 728.

During operation of the second clutch 48, when the piston 168 is moved toward the retracted position to cause disengagement of the first and second clutch plates 164, 166, the drain plug 716 seals the drain aperture 714 and the outer clutch plate carrier 160 rotates to throw lubrication fluid from the second cavity 180, through the vents 712 and into the third cavity 722 to minimize the amount of fluid through which the outer clutch plate carrier 160 rotates. When the piston 168 is moved toward the extended position to cause engagement of the first and second clutch plates 164, 166, the push rod 718 will cause corresponding motion of the drain plug 716, thereby opening the drain aperture 714 to permit lubricant fluid to drain from the third cavity 722 into the clutch sump 424 so that the second clutch 48 will be lubricated as it is being engaged (to transmit rotary power therethrough). It will be appreciated that the drain plug 716 is a valve that opens with movement of the piston 168 in a direction that causes engagement of the clutch plates 164, 166 and can be an equal percentage value.

It will be appreciated that lubrication of the first and second clutch plates 164, 166 is desirable when the second clutch 48 is actuated or engaged, and that such lubrication is generally not needed when the second clutch 48 is disengaged or not actuated. Additionally, it has been found that minimum drag torque in a plate clutch can be achieved when the plates have sufficient separation and there is an air-lubricant fluid mixture between the plates. With additional reference to FIGS. 9-11, a drag reduction system constructed in accordance with the teachings of the present disclosure, such as drag reduction systems 410, 710, may include a clutch plate lubrication system. In the examples provided, the hydraulic fluid pumped into the piston chamber 182 by the pump 172 can be the same type of fluid as the lubrication fluid used to lubricate the first and second clutch plates 164, 166.

As shown in FIG. 9, a clutch plate lubrication system 910 of a first construction can include a valve 912 and a supply conduit 914. The supply conduit 914 can be configured to receive fluid from the pump 172, or from the piston chamber 182, and spray the fluid into the second cavity 180 such that the fluid is sprayed between the first and second clutch plates 164, 166 to lubricate the first and second clutch plates 164, 166, and/or produce an optimal air-lubricant fluid mixture between the first and second clutch plates 164, 166. The supply conduit 914 can be disposed within the clutch housing 158. The valve 912 can be inline with the supply conduit 914 and configured to allow fluid to flow through the supply conduit 914 when open and prevent fluid from flowing through the supply conduit 914 when closed. The valve 912 can be configured to be normally open and to close when a threshold pressure is reached. In this configuration, the pump 172 can selectively provide fluid at a pressure, below that required to move the piston 168, to provide an optimal amount of fluid to the first and second clutch plates 164, 166 to maintain an air-lubricant mixture between the first and second clutch plates 164, 166 when the piston is retracted without the losses associated with continuous flow during full engagement. Alternatively, the valve 912 can be configured to be normally closed, to open when a first threshold pressure is reached, and to close when a second threshold pressure, higher than the first threshold pressure, is reached. In this configuration, the fluid can lubricate the first and second clutch plates 164, 166 before the first and second clutch plates 164, 166 become engaged without the losses of continuous flow after full engagement. The valve 912 can be a check valve or a pilot valve and the threshold pressure can be a pressure within the supply conduit 914, or within the piston chamber 182. The valve 912 can be disposed within the clutch housing 158. The supply conduit 914 can be configured such that the flow rate of fluid from the supply conduit 914 can be less than the flow rate of fluid to the piston chamber 182, such that the piston 168 can be operated while the clutch lubrication system 910 is operated.

Figure 10:
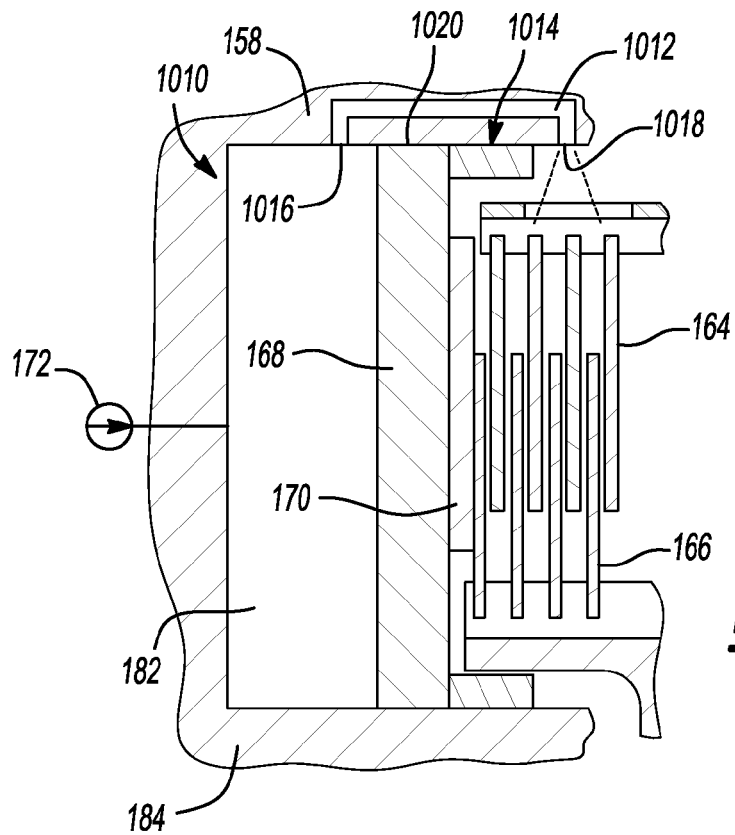
FIG. 10 is a schematic illustration of a fourth power transmitting component constructed in accordance with the teachings of the present disclosure.

In FIG. 10, a clutch plate lubrication system 1010 of a second construction can include a supply conduit 1012 and a valve 1014. The supply conduit 1012 can include an inlet 1016 in fluid communication with the piston chamber 182 and an outlet 1018 configured to spray the fluid on the first and second clutch plates 164, 166 to lubricate the first and second clutch plates 164, 166, and/or produce an optimal air-lubricant fluid mixture between the first and second clutch plates 164, 166. The supply conduit 1012 can be disposed within the clutch housing 158. The valve 1014 can include an outer surface 1020 of the piston 168 that can be configured to close the one or both of the inlet 1016 and outlet 1018. The outer surface 1020 can be configured such that the inlet 1016 is open when the piston 168 is fully retracted and the outer surface 1020 closes the outlet 1018 when the piston 168 moves a predetermined distance away from the fully retracted position. In this configuration, the pump 172 can selectively provide fluid at a pressure, below that required to move the piston 168, to provide an optimal amount of fluid to the first and second clutch plates 164, 166 to maintain an air-lubricant mixture between the first and second clutch plates 164, 166 when the piston is retracted and not when the piston 168 is fully extended, to avoid the losses of continuous flow after full engagement. Alternatively, the outer surface 1020 can close the inlet 1016 when the piston 168 is retracted and can open the inlet 1016 when the piston 168 is moved a first predetermined distance away from the fully retracted position. At this first predetermined distance, the inlet 1016 and outlet 1018 can be open to allow fluid to flow from the piston chamber 182, through the supply conduit 1012. When the piston 168 is moved a second predetermined distance away from the fully retracted position, greater than the first predetermined distance, the outer surface 1020 can close the outlet 1018 to prevent flow through the supply conduit 1012. In this configuration, the fluid can lubricate the first and second clutch plates 164, 166 before the first and second clutch plates 164, 166 become engaged without the losses of continuous flow after full engagement. The supply conduit 1012 can be configured such that the flow rate of fluid from the supply conduit 1012 can be less than the flow rate of fluid to the piston chamber 182, such that the piston 168 can be operated while the clutch lubrication system 1010 is operated.

Figure 11:
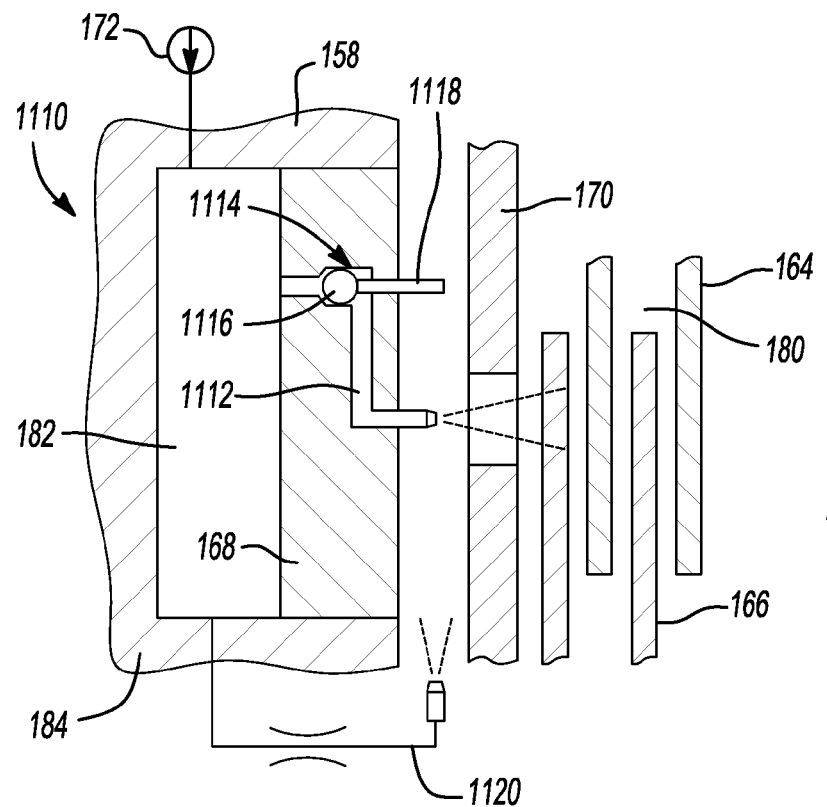
FIG. 11 is a schematic illustration of a fifth power transmitting component constructed in accordance with the teachings of the present disclosure.

In FIG. 11, a clutch plate lubrication system 1110 of a third construction can include a supply conduit 1112 and a valve 1114. The supply conduit 1112 is defined by the piston 168 and configured to receive fluid from the piston chamber 182 and spray the fluid into the second cavity 180 such that the fluid is sprayed between the first and second clutch plates 164, 166 to lubricate the first and second clutch plates 164, 166, and/or produce an optimal air-lubricant fluid mixture between the first and second clutch plates 164, 166. The valve 1114 can be mounted on the piston 168 or the apply plate 170 to selectively seal the supply conduit 1112. The valve 1114 can include a sealing element 1116 and a valve element actuator 1118. The valve 1114 can be configured to be normally open and to close when the piston 168 is moved a predetermined distance away from the fully retracted position. In one configuration, when the piston 168 reaches the predetermined distance, contact between the valve element actuator 1118 and the apply plate 170 forces the valve element actuator 1118 to move the sealing element 1116 to seal the supply conduit 1112. Alternatively, when the valve element actuator 1118 and sealing element 1116 are mounted on the apply plate 170 the piston 168 moves the supply conduit 1112 into engagement with the sealing element 1116 to seal the supply conduit 1112 when held in engagement with sufficient force. In this configuration, the pump 172 can selectively provide fluid at a pressure, below that required to move the piston 168, to provide an optimal amount of fluid to maintain an air-lubricant mixture between the first and second clutch plates 164, 166 when the piston is retracted without the losses of continuous flow after full engagement. Alternatively, the valve 1114 can be a normally closed valve that opens when it contacts another structure, such as the apply plate 170. The valve 1114 can be configured to then close again when the piston 168 is fully extended. In this configuration, the fluid can lubricate the first and second clutch plates 164, 166 before the first and second clutch plates 164, 166 become engaged without the losses of continuous flow after full engagement. The supply conduit 1112 can be configured such that the flow rate of fluid from the supply conduit 1112 can be less than the flow rate of fluid to the piston chamber 182, such that the piston 168 can be operated while the clutch lubrication system 1110 is operated.

Additionally, the clutch plate lubrication systems 910, 1010, 1110 can optionally include a continuous bleed conduit 1120. The continuous bleed conduit 1120 can be in fluid communication with the piston chamber 182 and be configured to spray fluid on the first and second clutch plates 164, 166 continuously when the pump 172 is operating. The continuous bleed conduit 1120 can allow fluid to flow from the piston chamber 182 at a flow rate less than the flow rate of fluid entering the piston chamber 182, such that the piston 168 can be operated while fluid passes through the continuous bleed conduit 1120 and the supply conduit 914, 1012, 1112.

Figure 12:
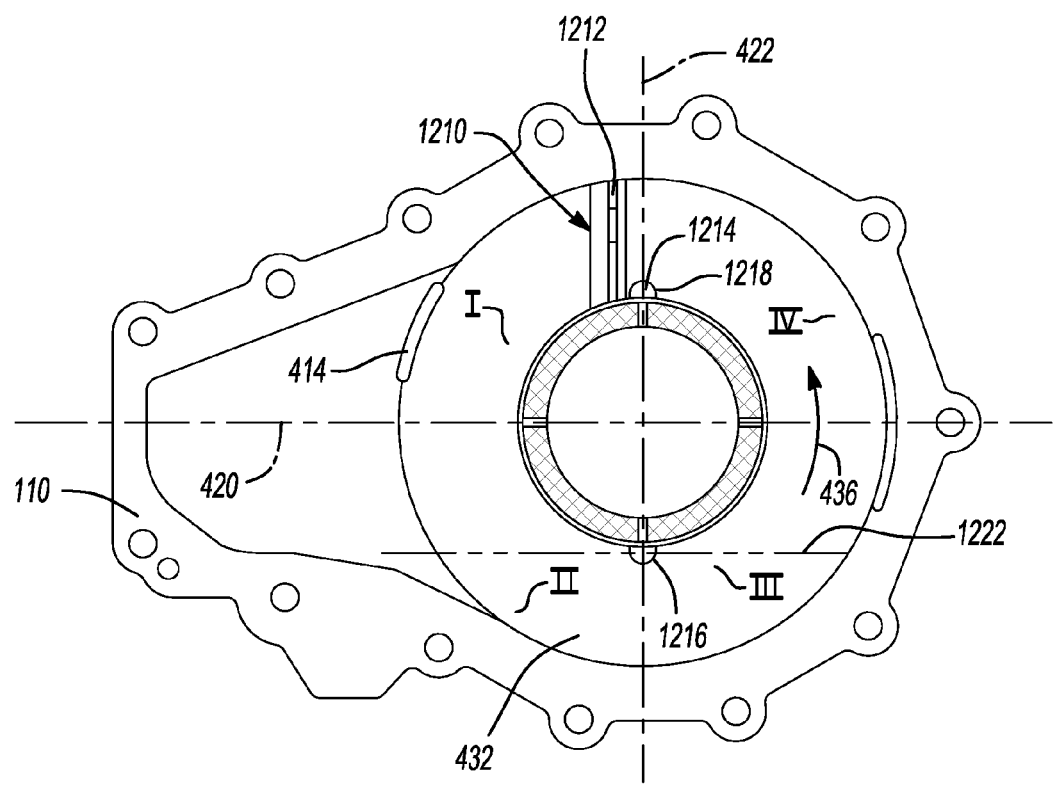
FIG. 12 is a side elevation view similar to that of FIG. 5 but depicting a portion of a sixth power transmitting component constructed in accordance with the teachings of the present disclosure.
Figure 13:
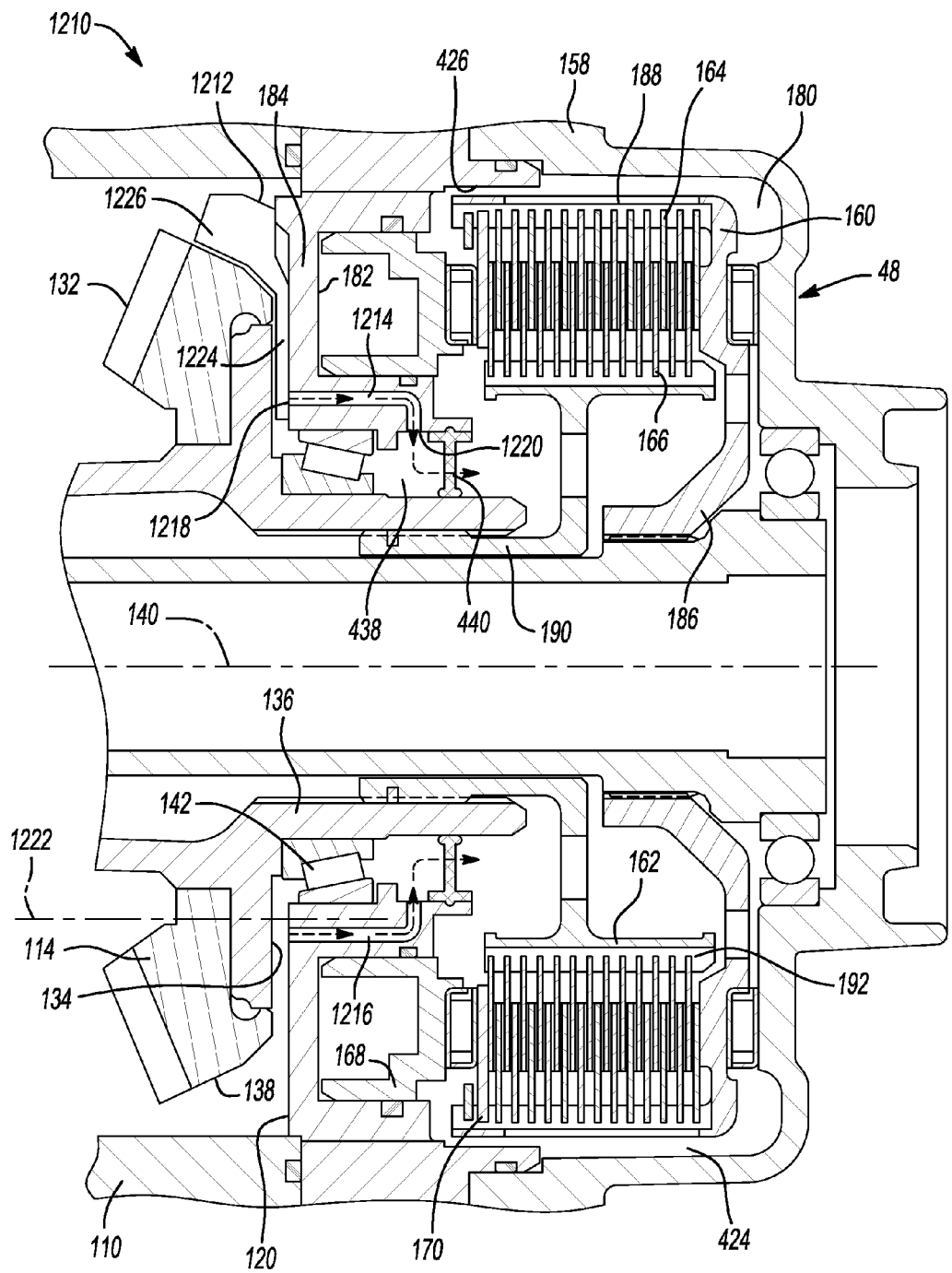
FIG. 13 is a cross-sectional view similar to that of FIG. 6 but depicting a portion of a seventh power transmitting component constructed in accordance with the teachings of the present disclosure.

With additional reference to FIGS. 12 and 13, a drag reduction system constructed in accordance with the teachings of the present disclosure such as drag reduction systems 410, 710, can include a wiper system 1210 configured to return fluid to the second cavity 180 from the first cavity 120 when the input member 114 rotates. The wiper system 1210 may include a wiper element 1212 and an upper bypass conduit 1214. The wiper system 1210 can also include a lower bypass conduit 1216. The wiper element 1212 can be disposed within the first cavity 120 between the input member 114 and the wall 184. The wiper element 1212 can be fixedly mounted to the housing 110 at the wall 184, and can be configured to direct fluid, which is rotating within the first cavity 120 due to rotation of the input member 114, to the upper bypass conduit 1214. The upper bypass conduit 1214 can have an inlet 1218 radially outward of the bearing 142. The upper bypass conduit 1214 can extend from the inlet 1218, axially toward the second cavity 180, to an outlet 1220 proximate to the second cavity 180 to bypass the bearing 142. The outlet 1220 can be configured to release the fluid into the annular cavity 438. The wiper element 1212 and inlet 1218 are located above a static fluid level 1222 of the hypoid sump 432, the static fluid level 1222 being the level at which the hypoid sump 432 fills with fluid when the input member 114 is not rotating. In the example provided, the inlet 1218 is located at approximately 12 o'clock relative to the second axis. When the input member 114 rotates in direction 436, some of the fluid in the hypoid sump 432 clings to the input member 114 and is rotated around the first cavity 120. The wiper element 1212 skims fluid off of the input member 114 and generally blocks fluid from rotating past the wiper element 1212 when the ring gear rotates. The wiper element 1212 directs the fluid radially inward to the inlet 1218 of the upper bypass conduit 1214. The wiper element 1212 can include a first portion 1224 and a second portion 1226. The first portion 1224 can be located between the back side 134 of the input member 114 and the wall 184 and extend radially outward from the inlet 1218 to the outer periphery 138 of the input member 114. The second portion 1226 can extend generally axially outward from the wall 184 and be configured to contour to the outer periphery 138 of the input member 114. The wiper element 1212, or a portion of the wiper element 1212 proximate to the input member 114, can be formed of a rubber or resilient material and can be configured to contact the input member 114.

When the input member 114 is not rotating, such as during 2wd operation, rotation of the outer clutch plate carrier 160 in the second cavity 180 causes lubricant fluid to be expelled from the second cavity 180 to the first cavity 120 through the vents 412, 414, as described with reference to FIGS. 4-6. The lubricant fluid can collect in the hypoid sump 432 until it reaches the static fluid level 1222. At the static fluid level 1222, the fluid can flow through the lower part of the bearing 142 or through the lower bypass conduit 1216. The lower bypass conduit 1216 can be substantially similar to the upper bypass conduit 1214, but is located at or below the static fluid level 1222. In the example provided, the lower bypass conduit 1216 is located at approximately 6 o'clock relative to the second axis 140. When the input member 114 rotates, some of the fluid can pass through the bearing 142, while the wiper element 1212 directs additional fluid through the upper bypass conduit 1214. In constructions of the drag reduction systems 410, 710 without the wiper element 1212, the flow rate of the fluid from the first cavity 120 to the second cavity 180 can be limited to the flow rate through the bearing 142 or by gravity. The wiper element 1212 and upper bypass conduit 1214 can provide additional fluid to the clutch sump 424 when 4wd or AWD is activated, while not inhibiting evacuation of fluid from the clutch sump 424 during 2wd mode when the input member 114 is not rotating.

Figure 14:
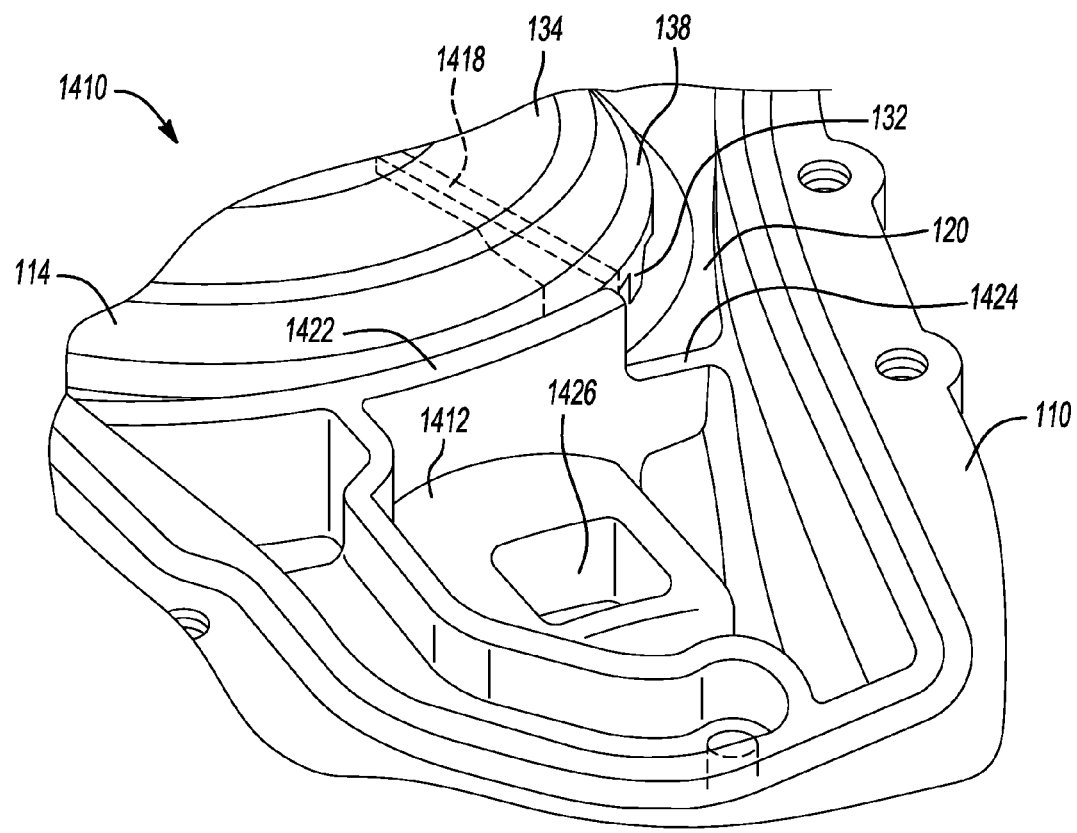
FIG. 14 is a perspective view of a portion of a clutch pump fluid system for use with the power transmitting components of the present teachings.
Figure 15:
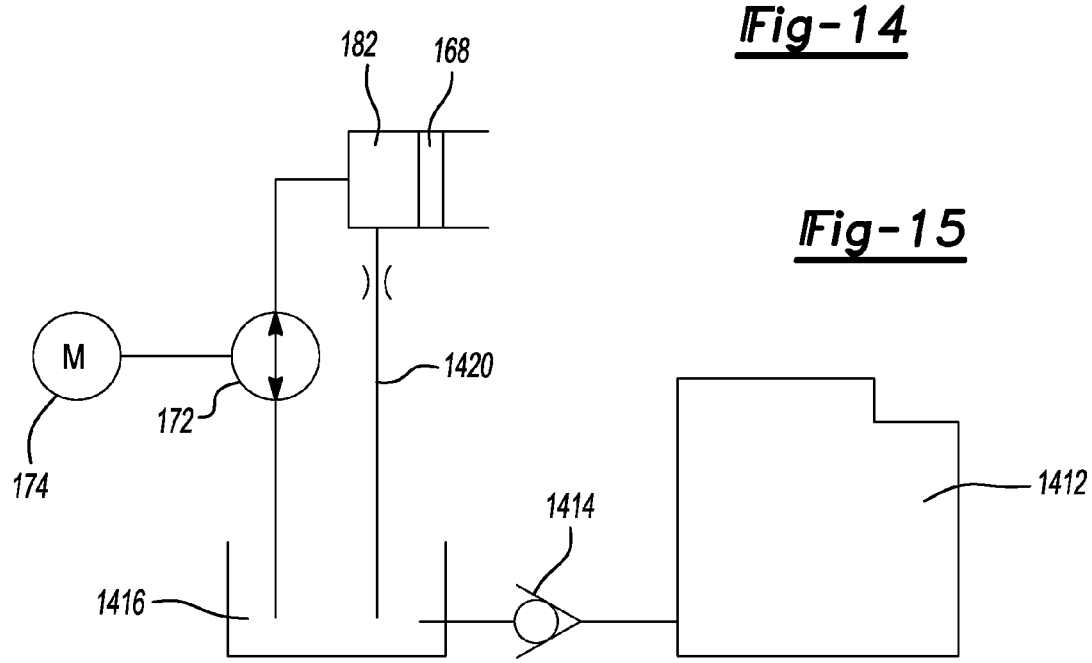
FIG. 15 is a schematic view of the clutch pump fluid system of FIG. 14.

With additional reference to FIGS. 14 and 15, a drag reduction system constructed in accordance with the teachings of the present disclosure, such as drag reduction systems 410, 710, may include a piston fluid accumulation system 1410. In the example provided, the hydraulic fluid pumped into the piston chamber 182 by the pump 172 (FIG. 2) can be the same type of fluid as the lubrication fluid used to lubricate input member 114 and the first and second clutch plates 164, 166. The piston fluid accumulation system 1410 can include a first reservoir 1412, a valve 1414, and a second reservoir 1416. The piston fluid accumulation system 1410 can also include a wiper element 1418 (shown in phantom) similar to wiper element 1212. Unlike wiper element 1212, the wiper element 1418 of the piston fluid accumulation system 1410 can be configured to direct fluid into the first reservoir 1412. A bleed conduit 1420 can also fluidly couple the piston chamber 182 with the second reservoir 1416 to allow fluid to bleed at a predetermined rate from the piston chamber 182 to the second reservoir 1416. The first reservoir 1412 can be defined by the housing 110 and be radially outward of the input member 114. The first reservoir 1412 can have a retaining wall 1422 proximate to the first cavity 120 and configured to separate the first reservoir 1412 from the first cavity 120 to generally retain fluid within the first reservoir 1412. The retaining wall 1422 defines a gap 1424 between the top of the retaining wall 1422 and the inner surface of the housing 110 configured to allow fluid to enter the first reservoir 1412 from the first cavity 120. In the example provided, the first reservoir 1412 is proximate to the input pinion 112 (FIG. 3) between the input pinion 112 and the pump 172 and includes a bore 1426 in fluid communication with the pinion shaft 124 and head and tail bearings 128, 130. The first reservoir 1412 is also in fluid communication with the second reservoir 1416 via the valve 1414. The second reservoir 1416 is in fluid communication with the pump 172 and configured to hold a volume of fluid greater than or equal to the volume needed to move the piston from the retracted position to the extended position.

In operation, when the input member 114 rotates, fluid from the hypoid sump 432 clings to the input member 114. Centrifugal force can throw some of the fluid from the rotating input member 114 through the gap 1424 and into the first reservoir 1412. Some of the fluid can exit the first reservoir 1412 through the bore 1426 to lubricate the head and tail bearings 128, 130 of the input pinion 112. When the ring gear is rotating at typical operating speed, the amount of fluid exiting the first reservoir 1412 through the bore 1426 can be less than the amount of fluid entering through the gap 1424. In this way, the first reservoir fills with fluid when the input member 114 rotates. When the first reservoir 1412 accumulates a predetermined amount of fluid, the valve 1414 (FIG. 15) opens to allow the fluid to flow from the first reservoir 1412 to the second reservoir 1416. The valve 1414 can be a one way valve, such that fluid cannot flow from the second reservoir 1416 to the first reservoir 1412. The valve 1414 can be configured to open mechanically when a pressure in the first reservoir 1412 reaches a predetermined pressure, or can be opened electronically. Alternatively, a cast feature such as an overflow wall (not shown) can be used instead of the valve 1414. Such an overflow wall would allow fluid to overflow from the first reservoir 1412 into the second reservoir 1416 when the level of fluid in the first reservoir 1412 exceeds the height of the overflow wall.

The second reservoir 1416 can be configured to hold a volume of fluid equal to or greater than the volume of fluid necessary to operate the piston 168. The valve 1414, or overflow wall, can retain this volume of fluid in the second reservoir 1416. In this way, the second reservoir 1416 is filled while the input member 114 is rotating, such as during 4wd operation, and the second reservoir 1416 retains sufficient fluid during periods when the input member 114 is not rotating, such as 2wd operation, to immediately activate the piston 168 and engage the second clutch 48. The second reservoir 1416 allows the pump 172 to have access to an adequate supply of fluid to operate the piston 168 to operate the piston 168. The fluid in the second reservoir 1416 is also less turbulent than the fluid contained in the first cavity 120 or the first reservoir 1412, reducing the risk of drawing air into the pump 172 and thus into the piston 168. The location of the second reservoir 1416 proximate to the first reservoir 1412 and the input pinion 112 allows the pump 172 to be located generally away from the ground (not shown) and to be protected by the clutch housing 158 and the housing 110 as shown in FIG. 2 while being able to be located adjacent to the second reservoir 1416.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A power transmitting component comprising:
a first output member and a second output member;
a housing defining a first cavity and a second cavity;
an input member configured to receive rotational power and rotate about a first axis;
a differential including a differential case and a differential gearset, the differential gearset being configured to transmit rotary power between the differential case and the first and second output members;
a clutch assembly including an inner carrier, an outer carrier, a plurality of first clutch plates, a plurality of second clutch plates, and a piston, the inner carrier being coupled for rotation with the input member, the outer carrier being coupled for rotation with the differential case, the first clutch plates being coupled for rotation with the inner carrier, the second clutch plates being interleaved with the first clutch plates and coupled for rotation with the outer carrier, and the piston being configured to move between a first position and a second position;
a fluid received in the first and second cavities;
a vent fluidly coupling the first and second cavities; and
a dam having a door member that is movable between an open position and a closed position;
wherein rotation of the outer carrier relative to the housing in a predetermined rotational direction through the fluid in the second cavity slings a portion of the fluid toward the vent to cause the portion of the fluid to be transferred from the second cavity, through the vent, and to the first cavity; and
wherein when the piston is in the second position, the door member is in the open position to allow fluid to flow from the first cavity to the second cavity, and when the piston is in the first position, the door member is in the closed position to limit fluid flow from the first cavity to the second cavity.

2. The power transmitting component of claim 1, wherein the door member is coupled for axial translation with the piston.

3. The power transmitting component of claim 1, further comprising a first flow path, the first flow path being radially inward of the piston and fluidly coupling the first and second cavities, wherein the dam limits flow through the first flow path when the door member is in the closed position.

4. The power transmitting component of claim 3, wherein the input member is received in the first cavity and configured to be lubricated by the fluid in the first cavity.

5. The power transmitting component of claim 4, further comprising a bearing configured to support the input member for rotation within the housing, the bearing being disposed within the first flow path and configured to allow the fluid to flow through the bearing.

6. The power transmitting component of claim 5, wherein the bearing is configured to pump the fluid from the first cavity toward the dam.

7. The power transmitting component of claim 1, wherein the vent is located above a static fluid level of the second cavity and proximate to an outer radial periphery of the second cavity.

8. The power transmitting component of claim 1, wherein the dam includes a pivot member and a link member, the door member being configured to pivot about the pivot member between the open and closed positions, the link member being coupled to the piston and configured to pivot the door member between the open and closed positions.

9. The power transmitting component of claim 8, wherein the dam includes a biasing member configured to bias the door member toward the closed position.

10. The power transmitting component of claim 9, wherein the biasing member is a torsion spring.

11. The power transmitting component of claim 1, wherein the first and second clutch plates are axially between first cavity and the input member.

12. The power transmitting component of claim 1, further comprising a pump, and a conduit, wherein the piston is slidably received within a piston chamber in the housing and is movable to an intermediate position between the first and second positions, wherein the pump is configured to selectively provide fluid to the piston chamber, and the conduit is configured to transmit fluid in a fluid path that extends from the pump or the piston chamber to the second cavity between the first and second clutch plates when the piston is disposed between the first position and the intermediate position.

13. The power transmitting component of claim 12, further comprising a valve in fluid communication with the conduit, wherein the piston is configured to move from the intermediate position to the second position when the pressure of the fluid in the piston chamber exceeds a first threshold pressure, wherein the valve includes a valve body, a valve element, and a valve element actuator, the valve element being received in the valve body and movable between a first valve element position, which permits fluid communication through the valve body, and a second valve element position that inhibits fluid communication through the valve body, the valve element actuator being configured to position the valve element in the second valve element position when the pressure of the fluid in the piston chamber exceeds the first threshold pressure, and to position the valve element in the first valve element position when the pressure of the fluid in the piston chamber is less than the first threshold pressure.

14. The power transmitting component of claim 13, wherein the piston is configured to move from the first position to the intermediate position when the pressure in the piston chamber exceeds a second threshold pressure, wherein the valve element actuator is configured to position the valve element in the second valve element position when the pressure in the piston chamber exceeds the second threshold pressure, and to position the valve element in the first valve element position when the pressure in the piston chamber is less than the second threshold pressure.

15. The power transmitting component of claim 12, wherein the conduit includes an inlet in an outer radial surface of the piston chamber and an outlet to the second cavity proximate to the first and second clutch plates, wherein the piston closes the outlet when the piston is between the intermediate and second positions, and wherein the outlet is open when the piston is between the first and intermediate positions.

16. The power transmitting component of claim 15, wherein the piston closes the inlet when the piston is in the first position, and wherein the inlet is open when the piston is between the first and intermediate positions.

17. The power transmitting component of claim 12, further comprising a valve in fluid communication with the conduit, wherein the valve includes valve body, and a valve element, the valve element being received in the valve body and movable between a first valve element position, which permits fluid communication through the valve body, and a second valve element position that inhibits fluid communication through the valve body, wherein the valve element is configured to be in the first valve element position when the piston is between the first and intermediate positions and configured to be in the second valve element position when the piston is between the intermediate and second positions.

18. The power transmitting component of claim 17, wherein the conduit is at least partly defined by the piston.

19. The power transmitting component of claim 18, wherein the valve includes a valve element actuator, the valve element actuator being mounted to one of the piston and a clutch apply plate and configured to contact one of the clutch apply plate and the valve element when the piston is between the intermediate position and the second position to position the valve element in the second valve element position.

20. The power transmitting component of claim 12, further comprising a bleed passage fluidly coupling the piston chamber with the second cavity, the pump being configured to transmit fluid to the piston chamber at a first flow rate, the bleed passage configured to bleed fluid from the piston chamber to the second cavity at a second flow rate less than the first flow rate.

21. A power transmitting component comprising:
a first output member and a second output member;
an input pinion configured for rotation about a first axis;
a housing defining a first cavity and a second cavity;
an input member received in the first cavity and configured for rotation about a second axis, the input member having a first face and a second face, the first face being configured to meshingly engage the input pinion;
a differential including a differential case and a differential gearset, the differential gearset being configured to transmit rotary power between the differential case and the first and second output members;
a clutch assembly being received in the second cavity and including a plurality of first clutch plates, and a plurality of second clutch plates, the plurality of first clutch plates being coupled for rotation with the input member, and the plurality of second clutch plates being interleaved with the first clutch plates and coupled for rotation with the differential case;
a first fluid passageway fluidly coupling the first and second cavities; and
a wiper member disposed within the first cavity and configured to direct a fluid from the second face of the input member to the first fluid passageway when the input member rotates relative to the housing about the second axis in a predetermined rotational direction.

22. The power transmitting component of claim 21, wherein the first fluid passageway is radially inward of an outer periphery of the input member.

23. The power transmitting component of claim 21, further comprising a bearing configured to rotatably support the input member within the housing, wherein the first fluid passageway bypasses the bearing to provide fluid from the first cavity to the second cavity without the fluid passing through the bearing.

24. The power transmitting component of claim 21, wherein the first fluid passage has an inlet opening into the first cavity above a static fluid level of the first cavity.

25. The power transmitting component of claim 24, further comprising a second fluid passageway fluidly coupling the first and second cavities, the second fluid passageway having a second inlet opening into the first cavity at or below the static fluid level.

26. The power transmitting component of claim 25, wherein when the input member rotates relative to the housing about the second axis in the predetermined rotational direction, fluid is transmitted from the first cavity through the first passageway and into the second cavity at a first rate, and wherein when the input member is not rotating relative to the housing, fluid is returned at a second rate from the second cavity to the first cavity through the second passageway, the first rate being greater than the second rate.

27. The power transmitting component of claim 21, wherein the wiper member is fixedly mounted to an inner wall of the housing, the inner wall partially defining the first cavity and being disposed between the first and second cavities.

28. The power transmitting component of claim 27, wherein the wiper member has first portion and a second portion, the first portion extending between the input member and the inner wall, the second portion extending axially outward from the inner wall and along an outer periphery of the input member.

29. The power transmitting component of claim 21, wherein a portion of the wiper member proximate to the input member is formed of a resilient material.

30. The power transmitting component of claim 29, wherein the portion is configured to skim fluid off of the second face of the input member.

31. A power transmitting component comprising:
a first output member and a second output member;
a housing defining a first cavity and a first reservoir, the first reservoir being in fluid communication with the first cavity;
an input pinion configured for rotation about a first axis;
an input member received in the first cavity and configured for rotation about a second axis, the input member configured to meshingly engage the input pinion;
a differential including a differential case and a differential gearset, the differential gearset being configured to transmit rotary power between the differential case and the first and second output members;
a clutch assembly including a plurality of first clutch plates, a plurality of second clutch plates, and a piston, the plurality of first clutch plates being coupled for rotation with the input member, the plurality of second clutch plates being interleaved with the first clutch plates and coupled for rotation with the differential case, the piston being configured to translate within a piston chamber in the housing between a first position and a second position;
a second reservoir fluidly coupled to the first reservoir; and
a pump configured to selectively pump a fluid from the second reservoir to the piston chamber to move the piston from the first position to the second position;
wherein the first reservoir is configured to catch fluid thrown by centrifugal force from the input member when the input member rotates relative to the housing in a predetermined rotational direction; and wherein the second reservoir is separate from the first reservoir and is configured to hold a volume of fluid that is employed to move the piston from the first position to the second position.

32. The power transmitting component of claim 31, wherein the input pinion is supported for rotation within the housing about the first axis by a head bearing and a tail bearing, and the first reservoir is configured to provide fluid to the input pinion between the head and tail bearings.

33. The power transmitting component of claim 31, further comprising a one-way valve disposed between the first reservoir and the second reservoir and configured to permit fluid to flow from the first reservoir to the second reservoir and to inhibit fluid flow from the second reservoir to the first reservoir.

34. The power transmitting component of claim 33, wherein the one-way valve opens when a pressure in the first reservoir reaches a predetermined pressure.

35. The power transmitting component of claim 33, wherein the one-way valve opens when the fluid in the first reservoir reaches a predetermined fluid level.

36. The power transmitting component of claim 31, further comprising a wiper element that is configured to direct fluid that has clung to the input member into the first reservoir when the input member rotates relative to the housing in the predetermined rotational direction.

37. The power transmitting component of claim 36, wherein a portion of the wiper element is formed of a resilient material and is configured to skim fluid off a surface of the input member.

* * * * *